United States Patent [19]

Andrev et al.

[11] 4,207,669

[45] Jun. 17, 1980

[54] DEVICE FOR MANUFACTURING AND INSERTING SINGLE-TURN COILS INTO MAGNETIC CORE SLOTS OF ELECTRICAL MACHINES

[76] Inventors: Anatoly G. Andrev, prospekt Partizansky, 87, kv. 48; Mikhail E. Makhanek, prospekt Partizansky, 93, kv. 27; Ilya A. Rubinchik, ulitsa Kalinina, 18, kv. 22, all of Minsk, U.S.S.R.

[21] Appl. No.: 939,798

[22] Filed: Sep. 5, 1978

Related U.S. Application Data

[63] Continuation-in-part of Ser. No. 780,439, Mar. 23, 1977, abandoned.

[30] Foreign Application Priority Data

Mar. 31, 1976 [SU] U.S.S.R. .............................. 2339122

[51] Int. Cl.² ............................................. H02K 15/00
[52] U.S. Cl. .................................................. 29/564.5
[58] Field of Search ................... 29/33 L, 33 K, 33 Q, 29/564.5, 564.6, 566.1, 566.3

[56] References Cited

U.S. PATENT DOCUMENTS

| | | | |
|---|---|---|---|
| 2,619,716 | 12/1952 | Swift | 29/566.1 X |
| 3,169,301 | 2/1965 | Fletcher et al. | 29/566.1 X |
| 3,187,784 | 6/1965 | Caldwell | 29/566.1 X |
| 3,413,714 | 12/1968 | Sheldon | 29/566.1 X |
| 3,557,432 | 1/1971 | Pavesi | 29/564.1 |
| 3,699,627 | 10/1972 | Jovin | 29/564.1 X |
| 3,921,284 | 11/1975 | Bucholtz et al. | 29/566.3 |

*Primary Examiner*—William R. Briggs
*Attorney, Agent, or Firm*—Lackenbach, Lilling & Siegel

[57] ABSTRACT

A device for manufacturing and inserting single-turn coils into the magnetic core slots of electrical machines comprises a mechanism for cutting off pieces of a wire conductor, a mechanism for bending the wire and shaping a loop, at least one mechanism for retaining and orienting coils made of concentrically arranged external and internal cylinders capable of rotating with respect to each other and having slots for accommodating the coils, said mechanism being made in the form of a detachable satellite with elements for fixing its position with respect to the working members of said mechanisms, a mechanism for moving apart the coils, a mechanism for transferring the set of coils, a mechanism for returning the cylinder to their initial position, a storing element, mechanisms for pressing-in the set of coils and for moving apart the ends of the coils at the commutator side, and transport mechanisms.

The device can be used, for example, for making the armatures of automobile starters.

9 Claims, 20 Drawing Figures

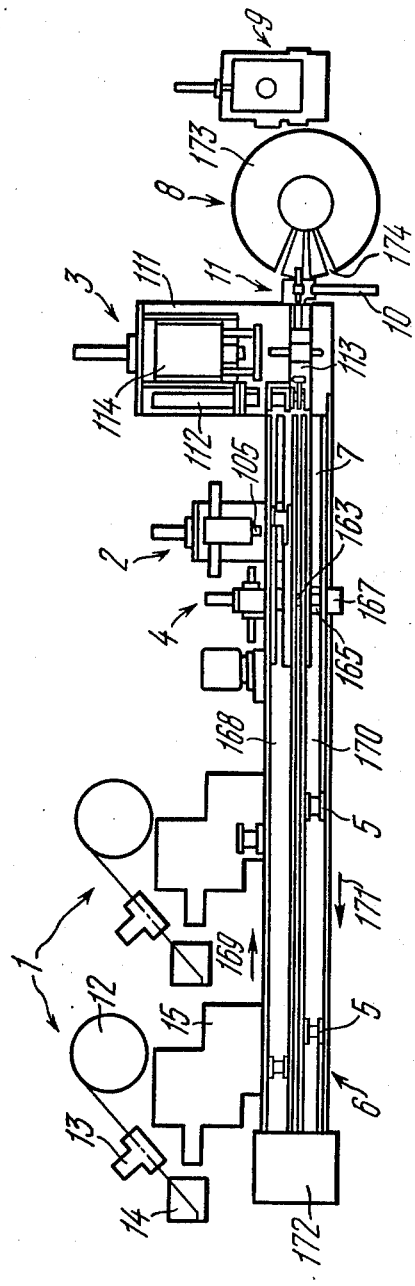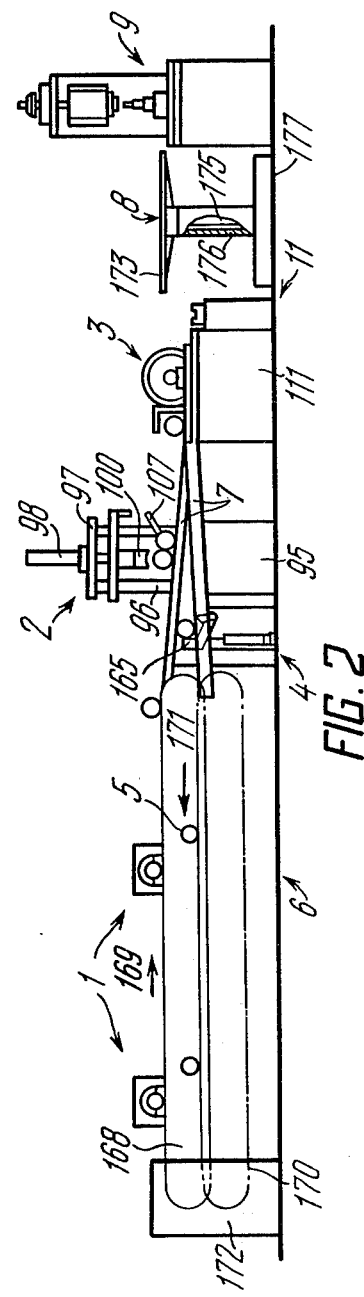

DEVICE FOR MANUFACTURING AND INSERTING SINGLE-TURN COILS INTO MAGNETIC CORE SLOTS OF ELECTRICAL MACHINES

CROSS-REFERENCE TO RELATED APPLICATION

This Application is a continuation-in-part of an earlier filed application having Ser. No. 780,439 and having been filed on Mar. 23, 1977, now abandoned.

FIELD OF THE INVENTION

The present invention relates to electrical machines and, more specifically, the invention relates to a device for manufacturing and inserting single-turn coils into the magnetic core slots of electrical machines. The device may be used, for example, in the manufacture of armatures of automobile starters.

DESCRIPTION OF THE PRIOR ART

Known in the art is a device for manufacturing and inserting single-turn coils into the magnetic core slots of electrical machines including a mechanism for feeding and straightening a wire conductor, a mechanism for cutting off pieces of the conductor, a mechanism for bending the conductor into loops, and a mechanism for shaping the coil ends at the commutator side of the electrical machine (cf. U.S.S.R. Inventor's Certificate No. 125,610, cl. HO2 K 16/09, 1960).

However, this device features low efficiency.

The closest solution of the problem, reached so far by known devices, is provided by a device for manufacturing and inserting single-turn coils into the magnetic core slots of electrical machines, which comprises mechanisms for feeding and straightening a wire conductor, a mechanism for cutting off pieces of the conductor, a mechanism for bending the wire and shaping a loop, a mechanism for retaining and orienting the coils, a mechanism for shaping the ends of the coils after the coils have been accommodated in the slots of the electrical machine comprising concentrically arranged cylinders adapted to rotate about each other, a mechanism for moving the coils apart, a mechanism for rotating the cylinders relative to one another, a mechanism to move and press-in a set of coils, a mechanism to transport apart the coils on the commutator side of the electrical machines and transporting mechanisms (cf. U.S.S.R. Inventor's Certificate No. 277,921, cl. HO2K. 15/081, 1970).

However, the above device also has low efficiency due to several factors:

rigid kinematic linkage of mechanisms performing operations of various durations (for example, the duration of bending the armature coil loops is 4 to 5 times longer than that needed for arranging and transporting the coil ends);

complicated structural and automatic control features and inconvenient adjustment and maintenance due to the complex kinematic diagram that is indispensable and cannot be simplified; and high percentage of irreparably defective coils since it is impossible to detect and eliminate defects in the process of automatic operation.

Moreover, the above device is liable to produce coils with end windings of an incorrect shape, since the initial rotation of the cylinders is accompanied by axial displacement, as they have a thread coupling, and the coils lying within the slots with a certain clearance may slip with respect to the cylinders.

Also known in the art are devices for transferring a workpiece from one operation to another consisting of slotted rotary discs (storing elements) and devices for pressing the coils into the armature slots and for arranging the coil ends at the commutator side of the electrical machine.

SUMMARY OF THE INVENTION

An object of the present invention is to increase the efficiency of the device.

Another object is to increase the number of coils.

The basic object of the invention is to provide a device for manufacturing and inserting single-turn coils into the magnetic core slots of electrical machines, which is made of separate mechanisms, which are being not interconnected kinematically.

These and other objects are attained by providing a device for manufacturing and inserting single-turn coils into the magnetic core slots of electrical machines comprising a mechanism for feeding and straightening a wire conductor, a mechanism for cutting off pieces of the wire, a mechanism for bending the wire and shaping a loop, at least one mechanism for retaining and orienting the coils comprising concentrically arranged cylinders adapted to rotate about each other and provided with slots to accomodate the loops, a mechanism for forming the coils performing the operation of rotating the cylinders of the mechanism for retaining and orienting the coils with respect to each other, a mechanism for rearranging a set of coils, a mechanism for pressing-in the set of coil and for moving the ends of coils apart at the commutator side of the electrical machine, a storing member and a transport mechanism. According to the invention, each mechanism for retaining and orienting the coils is made in the form of a detachable satellite with elements for fixing its position with respect to the working members of the mechanisms of the above mentioned device.

It is preferable to provide the external and internal cylinders of the mechanism for retaining and orienting the slots with stop members to limit the angle of rotation of the cylinders about each other, the internal cylinder being provided with a guide groove and the external cylinder being provided with a lug that enters the guide groove of the internal cylinder.

Such an embodiment of the mechanism for retaining and orienting the coils, in general, makes it possible to arrange a device consisting of individual mechanisms having no rigid kinematic coupling.

BRIEF DESCRIPTION OF THE DRAWINGS

The invention may be better understood from the following detailed description of one embodiment of the invention with reference to the accompanying drawings, in which:

FIG. 1 is a top, schematic view of the device for manufacturing and inserting single-turn coils into the magnetic core slots of electrical machines, according to the invention;

FIG. 2 is a front, schematic view of the device shown in FIG. 1;

DETAILED DESCRIPTION OF THE INVENTION

Figure 3:
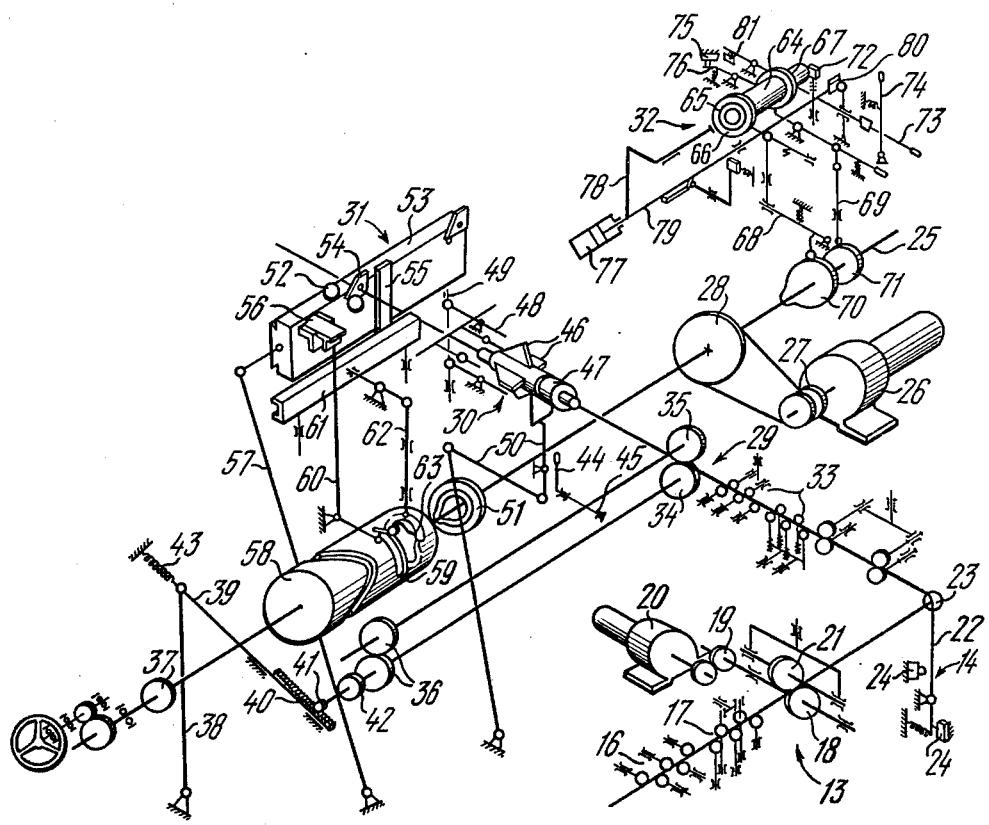
FIG. 3 is a kinematic diagram of the mechanism for bending the wire and shaping a loop in the device according to the invention.

The device for manufacturing and inserting single-turn coils in open-box and box-type slots of electrical machines comprises a loop shaping mechanism 1 (FIGS. 1 and 2) for bending a wire and shaping a loop, a forming mechanism 2 for forming the coils, a rearranging mechanism 3 for rearranging a set of coils, a rotating mechanism 4 for rotating the cylinders of retaining mechanisms 5 for retaining and orienting the coils, a transport mechanism 6, inclined gravity runners 7, a storing member 8, a moving mechanism 9 for pressing-in a set of coils and moving them apart at the commutator side, a runner 10 for delivering the armatures, and an armature lift member 11.

The mechanism 1 for bending the wire and shaping a loop includes a decoiler 12, an arrangement 13 for feeding and straightening the wire, a wire tension regulator 14 and a bending press 15.

The decoiler 12 is a tapered cup installed on a flat bed supported in bearings mounted on a fixed vertical shaft (not shown in FIG. 1).

The arrangement 13 for feeding and straightening the wire includes a set of straightening rollers 16 rotating about a horizontal axis and a set of straightening rollers 17 rotating about a vertical axis. A drive roller 18 is connected to a wire feed drive 20 through a gear train 19. The drive roller 18 and a spring-loaded pressure roller 21 are used for feeding the wire into the bending press 15.

The tension regulator 14 (FIGS. 1 and 3) is provided with a spring-loaded lever arm 22 having a rotating ring 23 through which the wire is passed. Terminal switches 24 control the wire feed drive 20. The bending press 15 includes a welded frame (not shown) with a cam shaft 25 installed inside this frame. Coupled mechanically to the cam shaft 25 through a safety coupling 27 and a chain drive 28 is a drive member 26. Mounted on the frame are a wire feed member 29, a looping member 31, and a receiver 32 of the mechanism 5.

The wire feed member 29 includes two blocks of straightening rollers 33, a guide roller 34, and a pressure roller 35, which are interconnected through a gear drive 36. The rollers are driven by a cam 37 rigidly secured on the cam shaft 25. The drive is effected through a rocker arm 38, a slide block 39, a rack 40, a gear 41 and a roller overrunning clutch 42. A spring 43 is used for returning the rack 39 and cam 37. A handle 44 is used for manually switching off the feed of the wire. The end of the handle 44 is provided with an eccentric cam 45 for lifting the pressure roller 35 when the handle 44 is being turned.

Supported on a common slide block 47 and arranged in a mutually perpendicular relationship are two pairs of cams 46 of the wire cutting member 30. The four cams 46 are mechanically connected through arms 48 to four wire cutters 49. To provide a time delay during the operation of the vertical and horizontal cutters 49, the two horizontal rollers 46 are axially offset from the vertical pair of rollers 46. Chambers are formed in the wire being cut due to the wedge shape of the horizontal cutters 49. Coupled mechanically to the slide block 47 are arms 50 with a master form 51 rigidly mounted on the cam shaft 25.

The looping member 31 includes fixed rollers 52, a slide block 53 carrying a pawl 54, and a vertically movable shaping die stamp 55 which is used for bending a loop with parallel ends out of the wire being fed through the fixed rollers 52. A shaping stamp 56 is used for obtaining the required shape of the front portion of the loop. The slide block 53 through an arm 57 is mechanically connected to a drum 58, which is rigidly mounted on the arm shaft 25. A master form 59 mounted on the drum 58 controls the motion of the shaping stamp 56 by means of a lever 60.

The die stamp 55, through a lifting plank 61 and a linkage 62, is connected to another master form 63 mounted on the drum 58. The pawl 54 provides for the insertion of the loops made in the looping member 31 into the slots of the mechanism 5 (FIGS. 1, 2) for retaining and orienting the coils. FIG. 3 shows the receiver 32 accomodating the mechanism 5 (not shown in FIG. 3). The receiver 32 comprises an annular bushing 64 with a lug 65. Also mounted on the bushing 64 are a ratchet wheel 66, having the same number of teeth as there are slots in the mechanism 5, and a toothed disc 67 having a lug at its end face and the same number of teeth to retain the annular bushing 64 after it has been advanced through one division. The ratchet wheel 66 and the toothed disc 67 are mechanically connected through arms 68 and 69 to cams 70 and 71, respectively. The cams 70 and 71 are rigidly secured to the cam shaft 25. In order to prevent the mechanism 5 from being ejected out of the annular bushing 64 when the loops are being inserted into its slots, a stop member 72 is provided, which is actuated by an arm 73 with a catch 74. A terminal switch 75, mechanically connected to the lug provided on the end face of the toothed disc 67 through an arm 76, is designed to stop the bending press 15 after the loops have been inserted into all the slots in the mechanism 5. A pneumatic cylinder 77, an arm 78, a link 79 and a cam 80 are made to move aside the stop member 72 and to eject the mechanism 5. A terminal switch 81 may be used to start the bending press 15.

The mechanism 5 (FIGS. 4, 5, 6 and 7) for retaining and orienting the coils is a removable attachment or satellite.

The mechanism 5 for retaining and orienting the coils is made in the form of concentrically arranged cylinders, namely: an external cylinder 82 (FIGS. 4 and 5) having slots 83 and an internal cylinder 84 rigidly secured to a splined bushing 85 by means of pins 86. The number of slots 83 in the external cylinder 82 and also in the splined bushing 85 is equal to that in the armature of the electrical machine being built.

Figure 4:
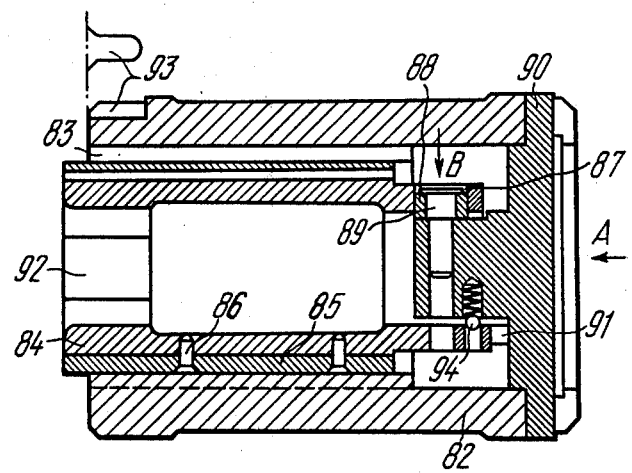
FIG. 4 is a cross-sectional view of the mechanism for retaining and orienting the coils in the device according to the invention.
Figure 5:
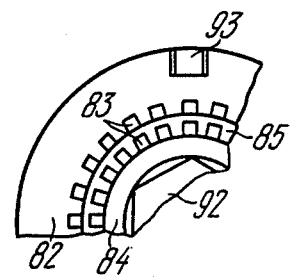
FIG. 5 is an enlarged view of a portion of the mechanism shown in FIG. 4, as seen from the coil mounting side.
Figure 6:
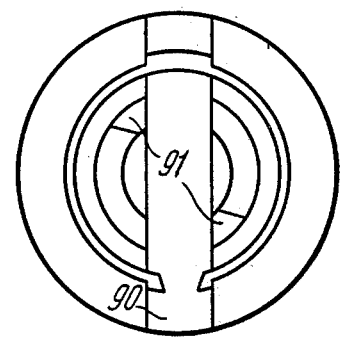
FIG. 6 is a view of the mechanism shown in FIG. 4, taken in the direction of arrow A.
Figure 7:
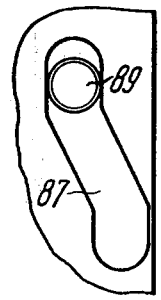
FIG. 7 is a view of the mechanism shown in FIG. 4, taken in the direction of arrow B.

During the coil forming process, when the internal cylinder 84 moves in the axial direction with respect to the external cylinder 82, the two cylinders are mechanically interconnected by a master form member in the form of a guide groove 87 (FIGS. 4 and 7) on the internal cylinder 84, which receives the lug of the external cylinder 82 made in the form of a roller 88 mounted on an axle 89 and rigidly connected to the external cylinder 82 through a stop member 90 (FIGS. 4, 6). The guide groove 87 (FIG. 7) is made of two rectilinear sections at the beginning and the end of the groove and an inclined section interconnecting the rectilinear sections. This eliminates any axial displacement of the cylinders at the beginning and end of the process of forming the coils.

Figure 8:
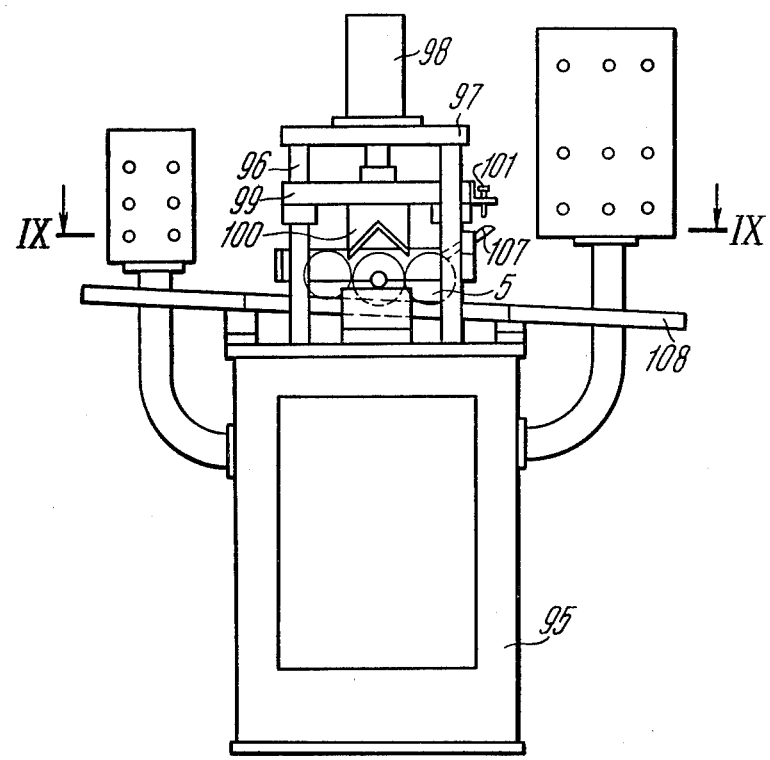
FIG. 8 is a front elevational view of the mechanism for forming the coils in the device according to the invention.
Figure 9:
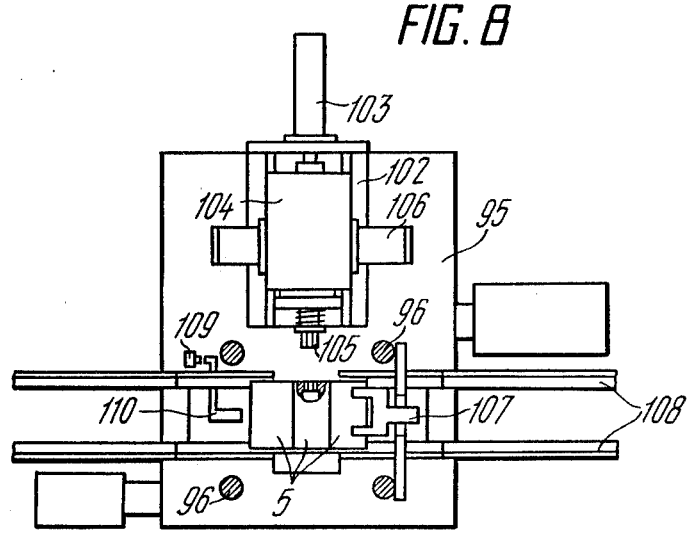
FIG. 9 is a cross-sectional view of the mechanism shown in FIG. 8, taken along the line IX—IX.

The mechanism 2 (FIGS. 1, 2, 8 and 9) for forming the coils includes a welded frame 95 on the top plate of which four upright members 96 are mounted (FIGS. 2, 8 and 9). To the upright members 96 is secured a plate 97 (FIGS. 2 and 8) with a hydraulic power cylinder 98 whose rod is connected to a movable plate 99. Secured to the movable plate 99 are a hold-down member 100 and a stop member 101.

Mounted on the top plate of the frame 95 are a guide member 102 (FIGS. 1 and 9) and a hydraulic power cylinder 103, which are used for moving a head 104. The head 104 has a rod with a spring-loaded hexagonal nut 105 on its end. Two hydraulic power cylinders 106 are designed for rotating the rod and nut 105 and are connected therewith through a rack drive. A rotary cut-off member 107 secured on the upright members 96 and controlled by the stop member 101 is used for stopping the retaining mechanisms 5 (FIGS. 1, 2, 8 and 9) from further movement along the inclined runners 108 (FIGS. 8 and 9), which represent a part of the gravity runners 7 (FIGS. 1 and 2) and mounted and on the frame 95. The coil forming mechanism 2 is automatically put into operation by a terminal switch 109 (FIG. 9), which through an arm 110 is connected to the mechanism 5 running along the inclined runners 108 (FIGS. 8 and 9).

Figure 10:
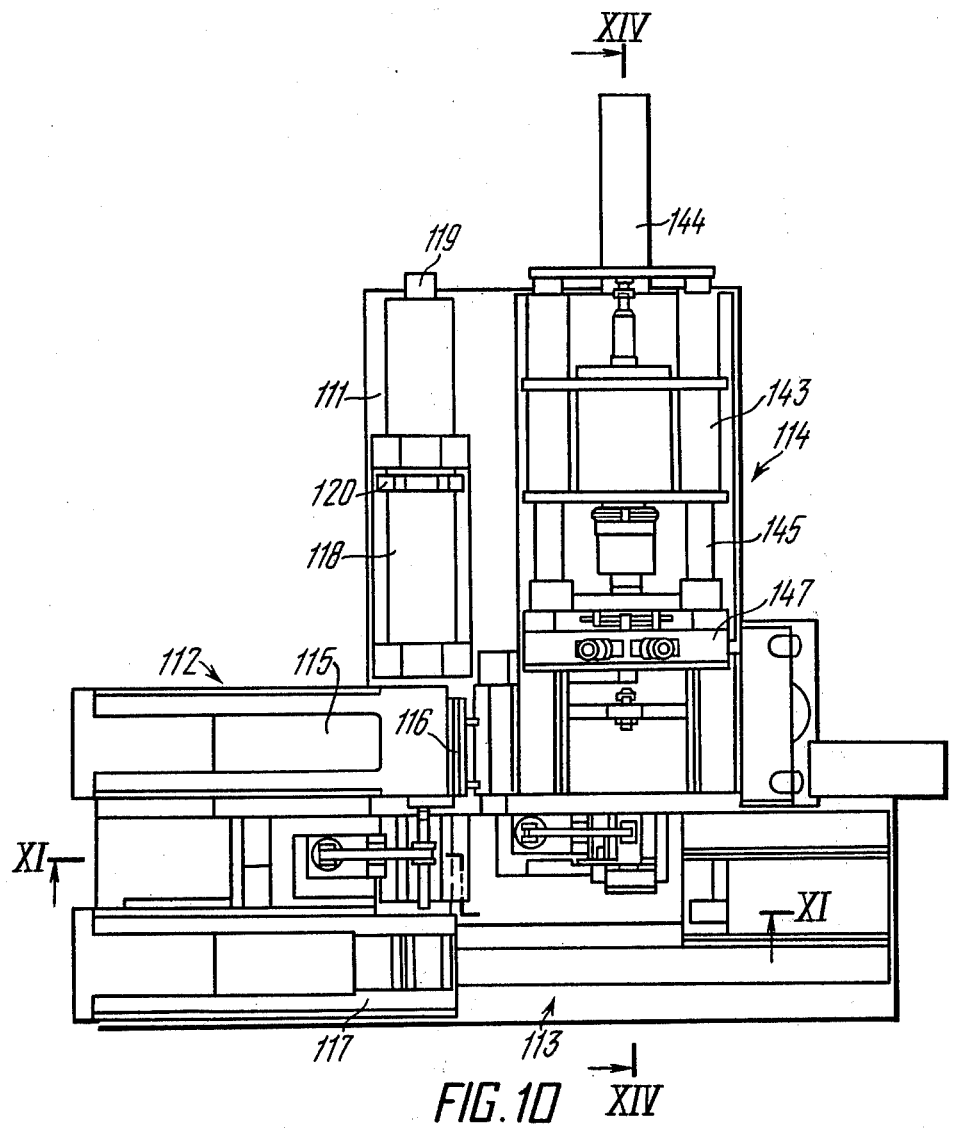
FIG. 10 is a top, plan view of the mechanism for rearranging the set of coils in the device according to the invention.

The mechanism 3 (FIGS. 1, 2 and 10) for rearranging the set of coils is provided with a bed 111, on the upper plate of which there are mounted a device 112 for loading the mechanisms 5 for retaining and orienting the coils, a work table 113 and a head 114 for removing the set of coils from the slots 83 (FIGS. 4 and 5) of the mechanism 5 and for inserting this set of coils into the armature slots.

Figure 11:
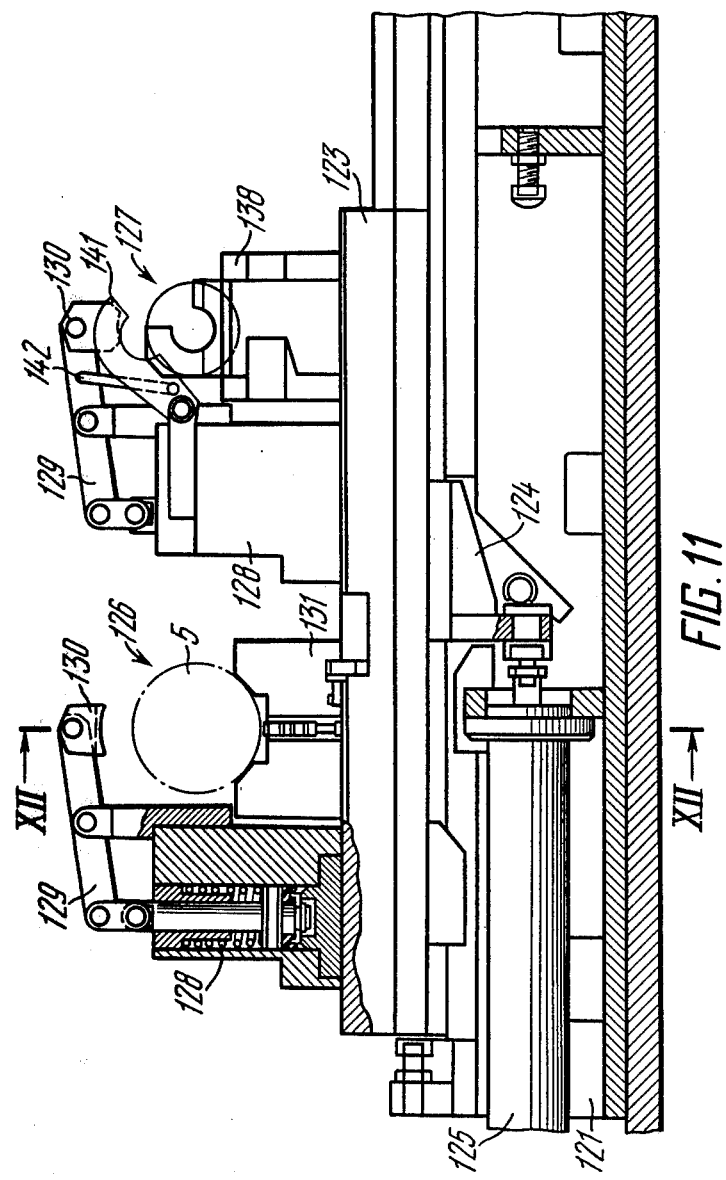
FIG. 11 is a cross-sectional view of the mechanism shown in FIG. 10 taken along the line XI—XI.
Figures 12, 13:
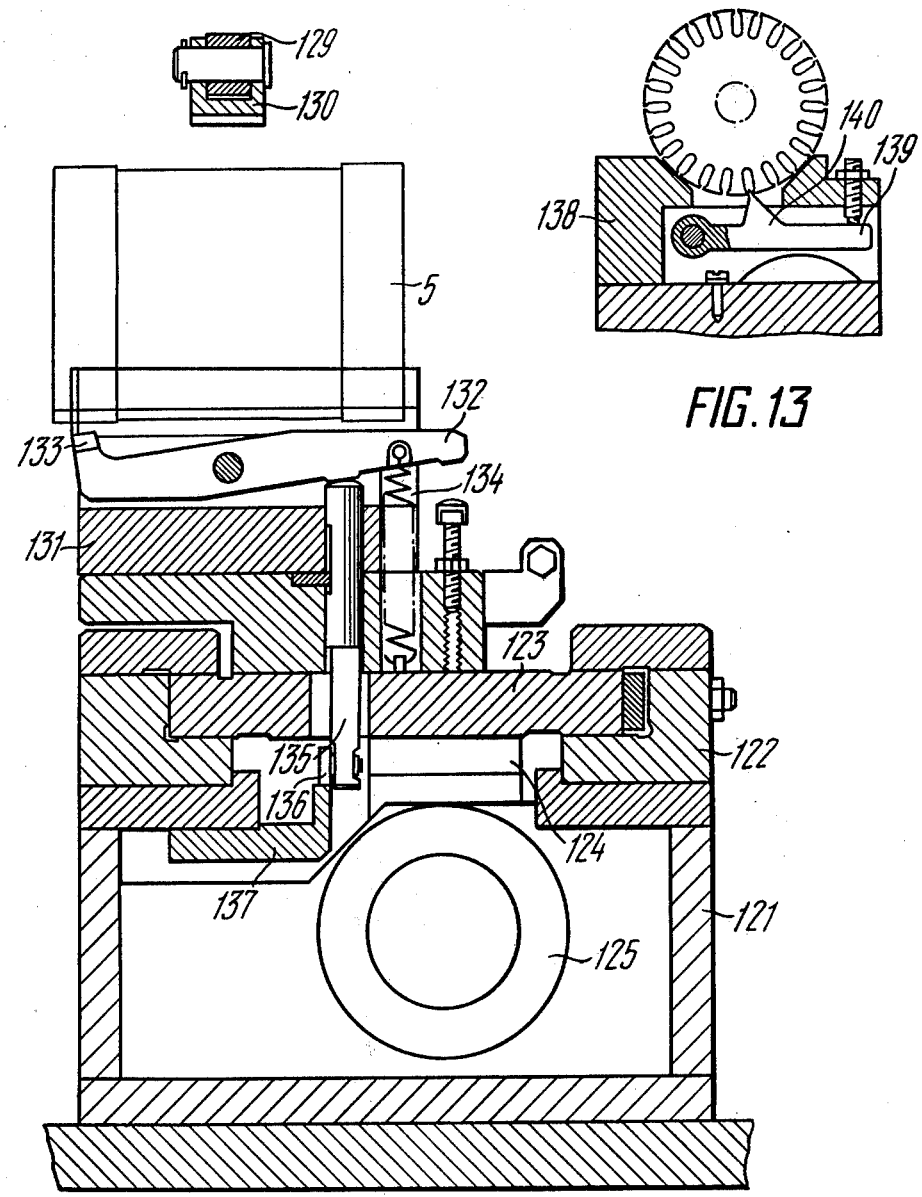
FIG. 12 is a cross-sectional view of the mechanism shown in FIG. 11 taken along the line XII—XII.
FIG. 13 is a cross-sectional view of the retainer of the armature holder of the mechanism for rearranging the set of coils.

The device 112 (FIG. 10) for loading the mechanisms 5 includes a delivery runner 115 with a stop member 116, a discharge runner 117, and a pusher 118 connected to the rod of the hydraulic power cylinder 119 through a clamp 120. The work table 113 (FIGS. 11 and 12) comprises a body 121, a guide member 122, a slide block 123 connected through a bracket 124 to the rod of a hydraulic power cylinder 125. Secured on the slide block 123 are an arrangement 126 for mounting the mechanism 5, an armature receiver 127 and two clamping hydraulic power cylinders 128 with arms 129 and clamps 130. The arrangement 126 includes a block member 131, in which there are secured a lever 132 with a lug 133 (FIG. 12) and a spring 134. The lug 133 is used for interaction with the slots 93 (FIGS. 4 and 5) of the mechanism 5 for orienting the slots relative to the working members. The lever 132 through a pusher 135 and a roller 136 is connected to a master form 137 rigidly secured on the body 121. The master form 137 controls the lever 132.

Figure 14:
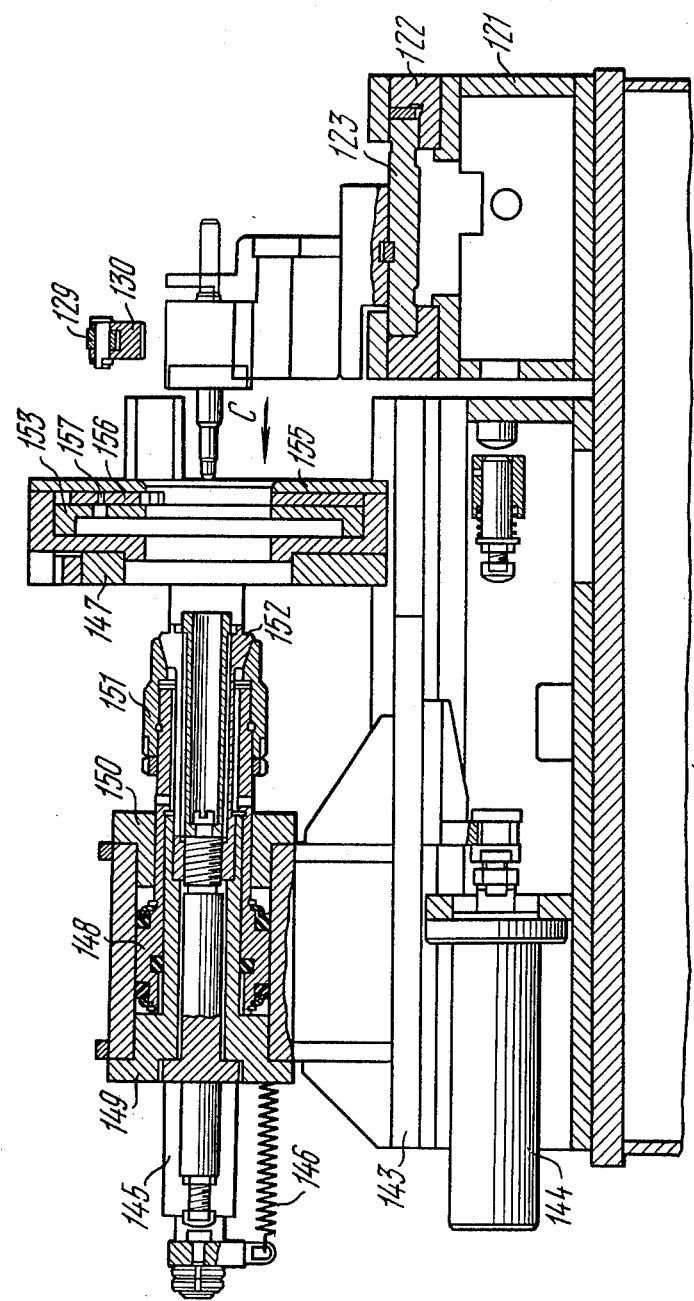
FIG. 14 is a cross-sectional view of the mechanism shown in FIG. 10 taken along the line XIV—XIV.
Figure 15:
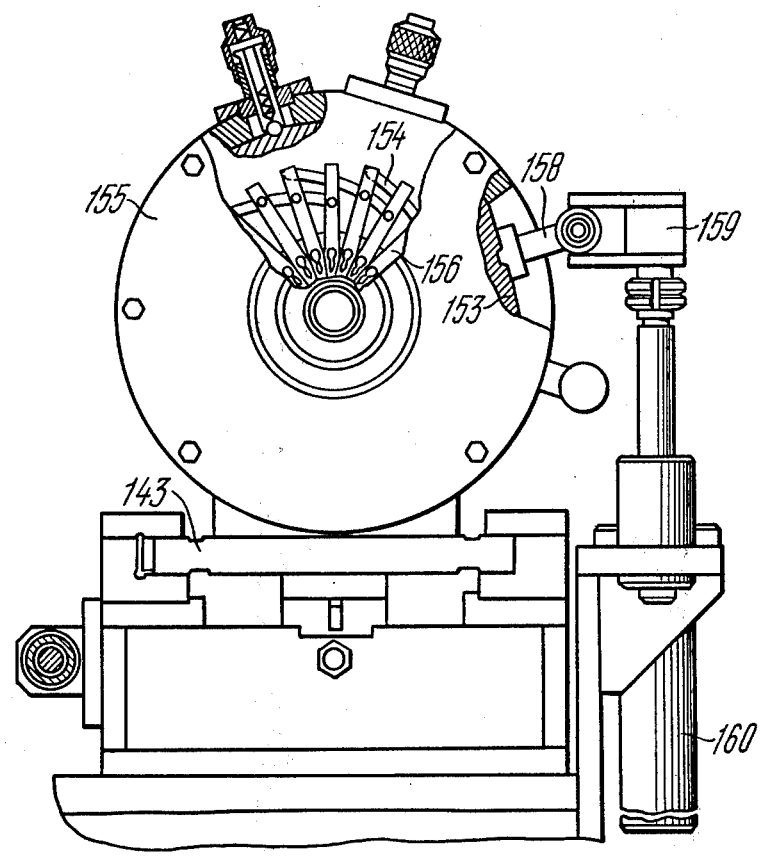
FIG. 15 is a side view of the mechanism shown in FIG. 14, in the direction of arrow C.

The armature receiver 127 (FIG. 11) comprises a block member 138 (FIGS. 11 and 13) carrying a spring-loaded retainer 139 (FIG. 13) having a tooth 140. A stop 141 (FIG. 11) is connected to a clamping hydraulic power cylinder 148 through a rod 142 and an arm 129. The head 114 (FIGS. 10, 14 and 15) for removing the set of coils from the slots 83 (FIGS. 4 and 5) of the mechanism 5 and for inserting the set of coils into the armature slots includes a body 143 (FIGS. 10, 14 and 15) connected to the rod of the hydraulic power cylinder 144. Movably mounted on the body 144 by means of guide members 145 and springs 146 is a mechanism 147 for supporting the ends of the coils. Inside the body 143 there is mounted another hydraulic power cylinder made in the form of a cylindrical rod 148 with a piston (FIG. 14) and end caps 149 and 150, a body 151 being rigidly secured to the rod 148 and a collet 152 being secured to the cap 149.

The supporting mechanism 147 (FIGS. 14 and 15) is provided with a disc 153 with helical grooves 154 (FIGS. 15), and a cap 155 with radial slots accomodating guide cams 156 (FIGS. 14 and 15) associated with the helical grooves 154 of the disc 153 through pins 157, the number of the guide cams 156 being equal to the number of slots in the armature being assembled. The disc 153 through a bracket 158 (FIG. 15) and a strip 159 is connected to a third hydraulic power cylinder 160.

Figure 16:
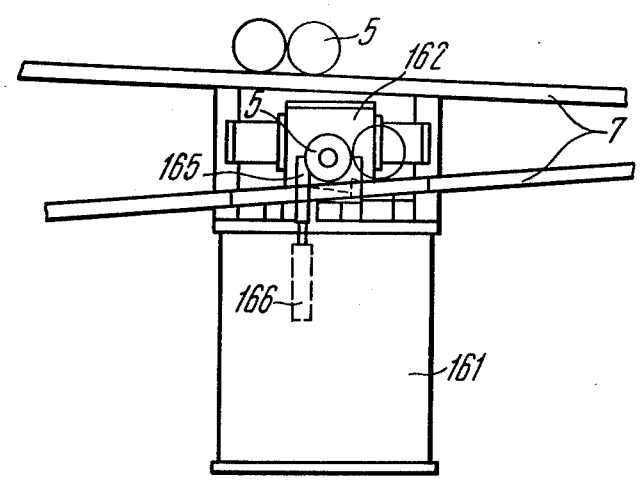
FIG. 16 is a front, elevational of the mechanism for rotating the cylinders of the mechanism for retaining and orienting the coils.
Figure 17:
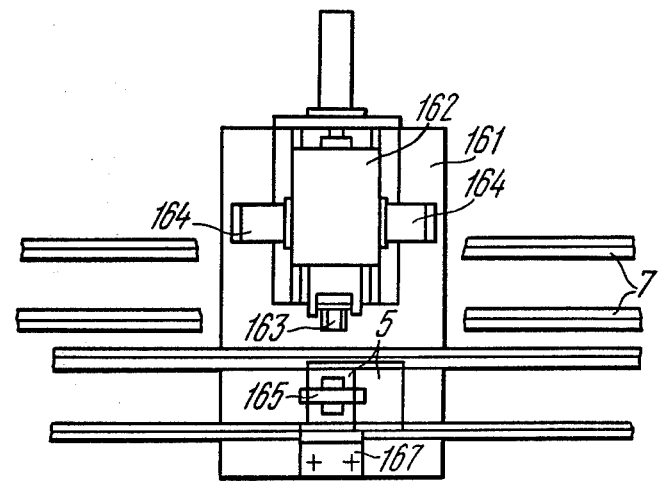
FIG. 17 is a top, plan view of the mechanism shown in FIG. 16.

The mechanism 4 (FIGS. 16 and 17) for rotating the internal cylinder 84 (FIGS. 4 and 5) of the mechanism 5 is provided with a welded frame 161 (FIGS. 16 and 17) having a delivery head 162 mounted on it. The delivery head 162 has a rod with a spring-loaded hexagonal nut 163 on its end, which is coupled to hydraulic power cylinders 164 through a rack drive. A cut-off member 165 (FIGS. 16 and 17) connected to the rod of another hydraulic power cylinder 166 is used for periodical delivery of the mechanisms 5 to the working position of the rotating mechanism 4 (FIGS. 1 and 2). The frame 161 also carries a stop member 167 and the inclined gravity runners 7 made in the form of beams of an angular cross section. In addition, the runners 115 (FIG. 10) and 117 of the rearranging mechanism 3 with the transport mechanism 6 make up a portion of the inclined runners 7 (FIGS. 1 and 2). The transport mechanism 6 includes two vertically closed chain drives, the working chain 168 of the chain drive is capable of moving to the right (along the arrow 169), and the return chain 170 moving to the left (along the arrow 171); furthermore, the return chain 170 is located below and offset from the working chain 168 which is arranged at the level of delivery of the mechanisms 5 from the receiver 32 (FIG. 3) of the mechanism 1 for shaping the loop. The transport mechanism 6 is also provided with a drive 172.

The storing member 8 (FIGS. 1 and 2) is provided with a disc 173 with radial slots 174 (FIG. 1) for acomodating the armatures. The disc 173 is rigidly mounted on a rotating shaft 175 mounted in a stationary housing 176 and connected to a drive 177.

Figure 18:
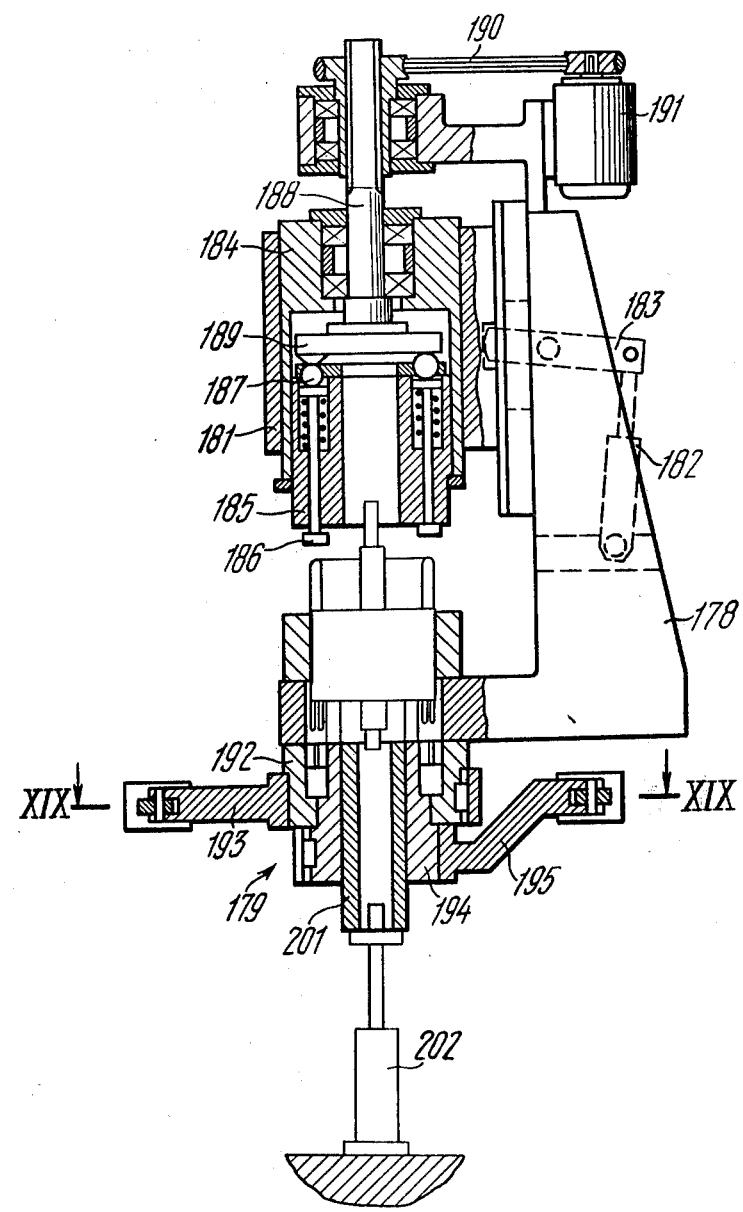
FIG. 18 is a cross-sectional view of the mechanism for pressing-in and moving apart the ends of the coils at the commutator side of the device according to the invention.
Figure 19:
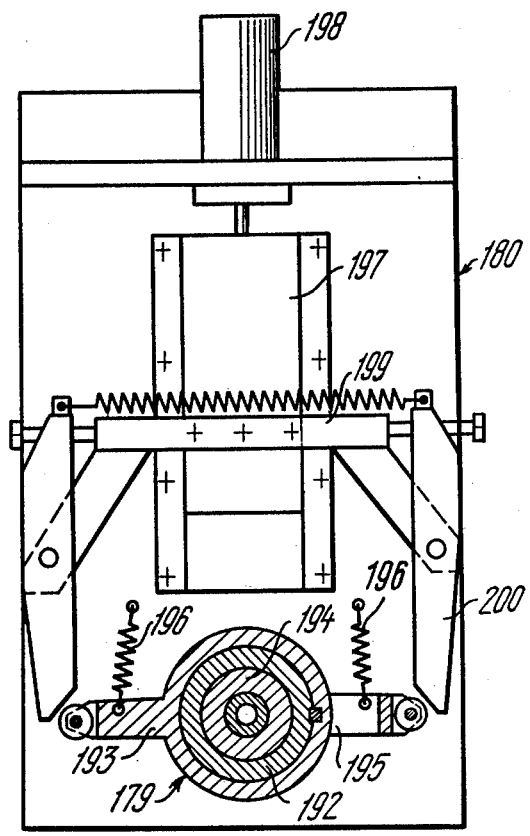
FIG. 19 is a cross-sectional view of the mechanism shown in FIG. 18 taken along the line XIX—XIX.

The mechanism 9 (FIGS. 18 and 19) for pressing-in the set of coils and moving apart the ends of the coils at the commutator side includes a frame 178, to the bottom portion of which there are secured an arrangement 179 for installing the armature and a mechanism 180 (FIG. 19) for moving apart the ends of the coils. Secured to the upper portion of the frame 178 (FIGS. 18 and 19) is a slide block 181 (FIG. 18) connected to a pneumatic cylinder 182 through an arm 183. Mounted in the slide block 181 is a sleeve 184 with the body 185, in the openings of which spring-loaded strikers 186 and bails 187 are arranged. In the upper portion of the sleeve 184 there is secured a drive shaft 188, to the lower end of which there is rigidly secured a disc 189 with a lug on its end face. The drive shaft 188 is coupled to an electric motor 191 through a V-belt drive 190.

The armature supporting arrangement 179 (FIGS. 18 and 19) is made in the form of concentrically arranged bushings with slots: an external bushing 192 with a bracket 193 rigidly secured therein and an internal bushing 194 with a bracket 195. The number of slots in each of the bushings is equal to the number of slots in the armature. Springs 196 are provided for keeping the internal bushing 194 and external bushing 192 in their respective initial positions.

The mechanism 180 (FIG. 19) for moving the ends of the coils apart includes a slide member 197 connected to a hydraulic power cylinder 198. Rigidly secured on the slide member 197 is a bracket 199 with two spring-loaded arms 200 used for rotating the bushings 192 and 194. A bushing 201 (FIG. 18) associated with a cylinder 202 is used for ejecting the armature after the coils have been moved apart.

Figure 20:
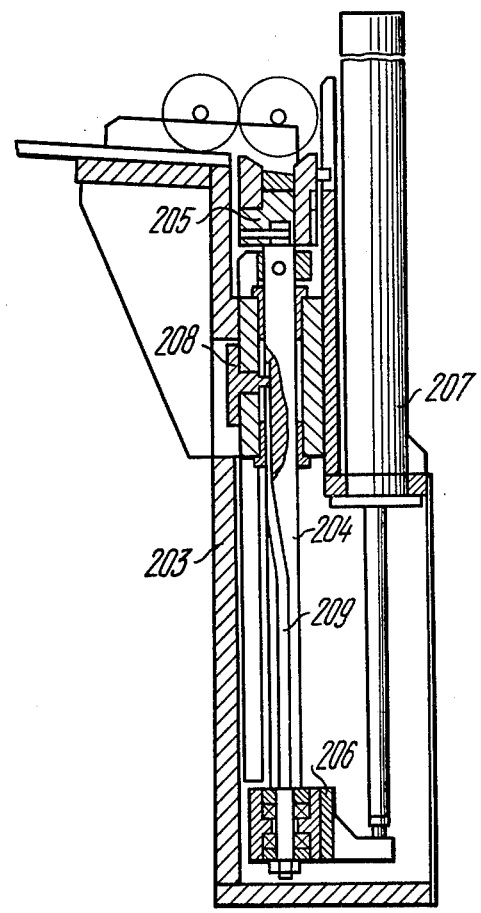
FIG. 20 is a cross-sectional view of the armature lift member in the device according to the invention.

The armature lifting member 11 (FIG. 20) comprises a body 203 accomodating a movable shaft 204 whose upper end carries a block member 205, and whose lower end is connected to the rod of a hydraulic power cylinder 207 through a bracket 206. A key member 208 rigidly secured on the body 203 is connected to the shaft 204 through a guide groove 209 made on the shaft 204. The guide groove 209 permits rotation of the shaft 204 during vertical movement of the shaft 204.

The proposed device operates as follows.

The wire mounted on the decoiler 12 is fed by the feed mechanisms 13 and 19 through the cut-off mechanism 30 into the looping mechanism 31 where a piece of a required length is cut off, shaped into the necessary form and inserted into the slots 83 of the mechanism 5 for retaining and orienting the coils. After that, the mechanism 5 turns automatically through one division and the next loop is inserted therein. Once a complete set of loops has been formed, the mechanism 1 for shaping the loop stops, the mechanism 5 for retaining and orienting the coils is pushed onto the working chain 168 of the transport mechanism 6 and is conveyed by gravity along the runner 7 to the mechanism 2 for forming the coils, where, upon reaching the working zone, it starts the automatic cycle of the machine. The hold-down member 100 moves downward and retains the mechanism 5. At the same time, the rotary cut-off member moves up and transfers the preceding mechanism 5 to a next position. The nut 105 is put into the opening 92 (FIGS. 4 and 5) of the internal cylinder 84 of the mechanism 5 and the internal cylinder 84 is rotated with respect to the fixed external cylinder 82. Thus, a set of coils is formed.

The mutual rotation of the external and internal cylinders 82 and 84 is limited by the stop members 91 provided on the cylinder 84, which come in contact with the stop member 90 rigidly connected to the fixed cylinder 82.

In order to provide a correct shape of the front portion of the set of coils with uniform clearances therebetween, care must be taken be prevent the coils from slipping in the slots 83 of the mechanism 5 during the initial period of rotation of the external and internal cylinders 82 and 84. This is achieved by the straight portion of the master form slot 87 (FIG. 6) which holds the coils in the slots of the external and internal cylinders 82 and 84.

After the nut 105 has been withdrawn from the opening 92 of the mechanism 5 and the hold-down member 100 has been raised, the mechanism 5 is moved to the cut-off member 107, while the preceding mechanism 5 is moved to the stop member 116 of the mechanism 3 for rearranging the set of coils. The pusher 118 moves the mechanism 5 with a set of coils onto the work table 113, while the immediately preceding, now empty mechanism 5 is pushed off the work table 113 and onto the return portion of the inclined gravity runner 7.

After manual orientation of the mechanism 5 and starting an automatic cycle, the mechanism 5 is clamped and the table 113 is moved to the right. After that the head 114 approaches the mechanism 5, removes the set of coils therefrom and, after the table 113 has moved to its initial (lefthand) position, inserts the set of coils into the slots of the armature which is installed by hand into the receiver 127 simultaneously with the removal of the set of coils.

The armature is fed to the mechanism for transporting the coils along the runner 10 for transferring the armatures from the preceding operations (e.g. lamination or shaft assembly), which are performed outside of the device. Then the armature is lifted by the device 11 to the receiver 127.

Upon coming into contact with the cut-off member 165, the mechanism 5 presses the terminal switch and switches on the cylinder rotating mechanism 4, so that the delivery head 162 approaches the mechanism 5 and presses the external cylinder 82 against the stop member 167. The nut 163 enters the opening 96 of the internal cylinder 84 and returns it to the initial position defined by the stop members 90 and 91.

After the delivery head 162 has been retracted and the cut-off member 165 has been lowered, the mechanism 5 is conveyed onto the return chain 170 of the transport mechanism 6 and is fed to the starting point of the assembly line to the mechanisms 1 for shaping the loop for repeating the operating cycle, while the cut-off member 165 and the mechanism 4 return to their initial positions.

The assembled armatures in the mechanism 3 for rearranging the coils are installed manually into the storing member 8 (into the radial slots 174 of the rotary disc 173 rotated by the drive 177) and then are fed into the mechanism 9 for pressing-in the set of coils into the armature slots. The mechanism 9 is switched on by depressing the button on the control desk. After that the slide block 181 moves downward and, in order to insert the sets of coils to a required depth, actuates the mechanism 180 to move the ends of the coils apart at the commutator side. After the coils have been moved apart, the mechanism 180 returns to its initial position, the slide block 181 moves upward and the bushing 201 ejects the armature. The armature is taken from the device by hand and is transferred to the subsequent operations performed outside of the device.

In the above described device there is given a preferred embodiment of the mechanism 5 for retaining and orienting the coils.

It is clear to those skilled in the art that this mechanism may have another design but in this case it must satisfy the following requirements.

The external and internal cylinders must be rotatable with respect to each other and the internal cylinder must be capable of moving in an axial direction. The angle of turn of the cylinders must be constant for one type of the armature being assembled. The external and internal cylinders must be provided with slots whose number is equal to the number of coils in the armature to be assembled. The external cylinder must be provided with a master groove for fixing this cylinder with respect to the working members of the mechanisms, and the internal cylinder must be provided with a shaped opening for interaction with the working members of the mechanisms.

The mechanism 2 for forming the coils, the mechanism 3 for rearranging the coils, the mechanism 9 for pressing-in the set of coils and for moving apart the ends of the coils at the commutator side are actuated by the hydraulic power cylinders fed from individual hydraulic stations, while the mechanism 4 for rotating the cylinders is actuated by a pneumatic system. The mechanism 1 for shaping the loop, the transport mechanism 6 and the storing member 8 are provided with electromechanical drives.

All the mechanisms are controlled by known traditional means.

The main advantages of the above described device are an increase in the quality of the assembled products and a considerable increase in the efficiency compared to the known devices.

We claim:

1. A device for manufacturing and inserting single-turn coils into the magnetic core slots of an armature of electrical machines, comprising:
    at least one retaining mechanism for retaining and orienting the coils having internal and external cylinders and means for connecting said cylinders to each other,
    said cylinders being mounted concentrically for rotation relative to each other and having slots whose number and location corresponds to the number and location of slots of the armature,
    said retaining mechanisms being made as a satellite and being transferrable from one operating position to another;
    a transport mechanism, for transferring said retaining mechanisms from one operating position to another, comprising a chain conveyer with a drive and inclined gravity runners;
    a loop shaping mechanism, for bending a wire and shaping loops, providing with a decoiler, a wire tension regulator, means for feeding and straightening the wire, means for cutting the wire and a bending press, said loop shaping mechanism cutting the wire into blanks of a required length and forming loops of appropriate size and shape,
    said loops being sized and shaped for insertion into said retaining mechanism;
    a forming mechanism for forming the coils including means for clamping the external cylinder of said retaining mechanism and means for rotating the internal cylinder of said retaining mechanism for formation of a set of coils of the assembled loops in said retaining mechanism;
    a rearranging mechanism for rearranging the set of coils provided with means for withdrawing the set of coils from said retaining mechanism and for inserting said set of coils into the armature slots;
    a rotating mechanism for rotating said cylinders of the retaining mechanism and for returning them to their initial positions with respect to each other;
    a storing member provided with slots for mounting the armature with the inserted coils; and
    a moving mechanism, for pressing-in the set of coils and moving apart the ends of the coils, provided with means for forcing the coils into the armature slots and with means for moving apart the ends of the coils forced into the armature slots.

2. A device according to claim 1, wherein said external and internal cylinders of said retaining mechanism are provided with stop members for limiting the angle of rotation of the cylinders with respect to each other;
    said internal cylinder has a master slot; and
    said external cylinder has a lug entering said master slot for axial displacement of the internal cylinder relative to the external cylinder during its rotation, the amount of displacement being defined by the shape of said master slot.

3. A device according to claim 2, wherein said external cylinder of said retaining mechanism has a recess designed for interaction with lug means of the other mechanisms for effecting mutual orientation of said retaining mechanism with the working members of said other mechanisms; and
    said internal cylinder is provided with a shaped opening to be used for interaction with nut means of said other mechanisms.

4. A device according to claim 3, wherein one of said cylinders is provided with a spring-loaded lug, and the other cylinder is provided with a recess for preventing spontaneous turning of the cylinders.

5. A device according to claim 1, wherein said decoiler is made in the form of a disc with a truncated cone in the center rotating about a stationary axle and designed for laying the coil of wire;
    said wire tension regulator is made in the form of a spring-loaded arm with a rotary ring for passing the wire,
    said spring-loaded arm acting on terminal switches performing the delivery of wire from the coil and cutting said delivery off;
    said mechanism for feeding and straightening the wire includes a set of horizontally and vertically arranged straightening rollers for straightening the wire in the horizontal and vertical planes, a drive roller and a springloaded drive roller interacting with said drive roller providing delivery of the wire per definite length due to the rotation of said rollers;

said means for cutting the wire includes two pairs of mutually perpendicular cutters cutting the wire and sharpening its end; and said bending press includes means for bending the wire and shaping the loop, and a receiver means for insertion of said retaining mechanism; and further comprising means for inserting the loop a definite depth into said slots of said retaining mechanism; and means for rotating said receiver means for indexing the next slots of said retaining mechanism for insertion of the next loop.

6. A device according to claim 1, wherein a head of said forming mechanism is provided with means engaging said shaped opening of said internal cylinder of the retaining mechanism for rotation of said internal cylinder with respect to said external cylinder clamped by the clamping block;

said rearranging mechanism is provided with means for reloading of said retaining mechanisms, a work table and a head for withdrawing the set of coils; and said means for releasing said retaining mechanisms removes the set of coils from said retaining mechanism and lays the set of coils into the armature slots, said head being provided with means for clamping the set of coils and with means for maintaining and guiding the ends of the coils, and said work table being provided with means for receiving said retaining mechanisms and with a receiver for the armatures.

7. A device according to claim 1, wherein said transport mechanism includes a chain conveyer with a drive and gravity runners;

said chain conveyor includes two vertically closed chain drives of a different height having a common actuator, said chain drives being used for conveying said retaining mechanisms from said loop shaping mechanism to said forming mechanism and back; and said gravity runners provide transfer of said retaining mechanisms from the upper chain drive to said mechanism for transferring the coils and back to the lower chain drive.

8. A device according to claim 1, wherein said rotating mechanism the cylinders of said retaining mechanism is provided with means engaging the opening of said internal cylinder for rotation and return to an initial position.

9. A device according to claim 1, wherein said storing element includes a rotary disc mounted on a shaft, said disc being provided with slots for mounting the armature.

* * * * *